Figure 1:
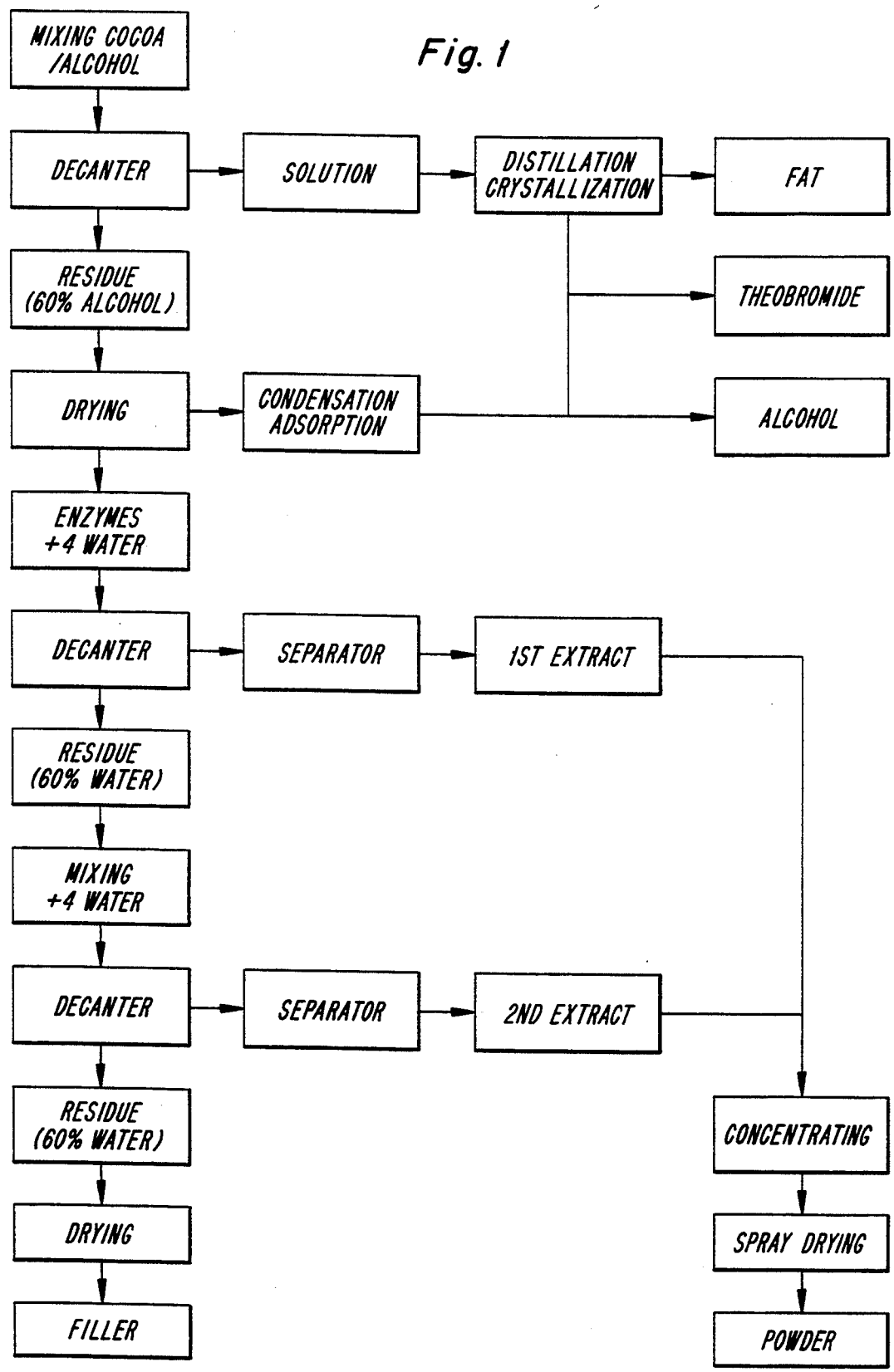

United States Patent
Vogt et al.

[11] Patent Number: 5,338,554
[45] Date of Patent: Aug. 16, 1994

[54] PROCESS FOR PRODUCING A SOLUBLE COCOA PRODUCT

[75] Inventors: Siegfried Vogt, Lilienthal; Wolfgang Krempel; Ute Assenmacher, both of Bremen, all of Fed. Rep. of Germany

[73] Assignee: Jacobs Suchard AG, Zurich, Switzerland

[21] Appl. No.: 861,035

[22] Filed: Mar. 31, 1992

Related U.S. Application Data

[63] Continuation of Ser. No. 493,517, Mar. 14, 1990, abandoned.

[30] Foreign Application Priority Data

Mar. 16, 1989 [DE] Fed. Rep. of Germany ....... 3908649

[51] Int. Cl.$^5$ .............................................. A23F 5/00
[52] U.S. Cl. ...................... 426/45; 426/429; 426/431; 426/593; 426/631
[58] Field of Search ............ 426/45, 431, 44, 49, 426/52, 306, 425, 429, 489, 590, 593, 615, 629, 631, 659, 660

[56] References Cited

U.S. PATENT DOCUMENTS

| | | |
|---|---|---|
| 2,512,663 | 6/1950 | Masurovsky . |
| 2,965,490 | 12/1960 | Rusoff ................................. 426/45 |
| 3,615,659 | 10/1971 | Weber ............................. 426/431 X |
| 3,792,184 | 2/1974 | Inagami et al. . |

FOREIGN PATENT DOCUMENTS

| | | |
|---|---|---|
| 118901 | 9/1984 | European Pat. Off. . |
| 2055030 | 5/1972 | Fed. Rep. of Germany . |
| 3131530 | 6/1982 | Fed. Rep. of Germany . |
| 2114637 | 6/1972 | France . |
| 693666 | 7/1953 | United Kingdom . |

Primary Examiner—Donald E. Czaja
Assistant Examiner—Leslie Wong
Attorney, Agent, or Firm—Burns, Doane, Swecker & Mathis

[57] ABSTRACT

The invention relates to a process for producing a soluble cocoa product. Cocoa powder is subjected to an extraction with alcohol, particularly with ethanol, and from the residue a water extract is prepared. This water extract is concentrated and as a soluble cocoa product it can be put to many uses as basic substance for beverages, confectionary, ice-cream, pastries etc.

8 Claims, 1 Drawing Sheet

PROCESS FOR PRODUCING A SOLUBLE COCOA PRODUCT

This application is a continuation of application Ser. No. 07/493,517, filed Mar. 14, 1990, now abandoned.

DESCRIPTION

The present application relates to a process for producing a soluble cocoa product with improved properties.

The known processes for producing soluble cocoa products such as instant powder for making beverages with cocoa flavour heretofore have been unsatisfactory. The products made accordingly show disadvantages as regards their organoleptic properties and their consistency: As beverages they result for instance in instable solutions in which undissolved particles settle and contained fat floats on the surface. Besides, the known processes usually produce insufficient yields. Soluble cocoa products are generally made by extracting cocoa material such as cocoa nibs and cocoa powder.

U.S. Pat. No. 3,615,659 describes a process for producing a chocolate-flavoured beverage which comprises the following process steps:

Extracting cocoa with water at a temperature of below 80° C.;

heating the extract to a temperature between 110° and 130° C.

subsequent cooling to 20° C. to 5° C. in order to precipitate insoluble substances;

separating insoluble substances and sterilizing the beverage.

With this process, a starch-degrading enzyme is added to the cocoa-water mixture in order to increase the yield.

The disadvantages of the process according to U.S. Pat. No. 3,615,659 primarily are that the fat content in the starting material due to its solubility behaviour prevents a satisfactory extraction of the soluble cocoa components and herewith negatively affects the consistency of the product.

The present invention is designed to meet the problems of the prior art. One object of the invention is to provide a process for producing a soluble cocoa product with improved organoleptic properties and/or improved properties which are relevant for application on the basis of an extraction of cocoa powder with water and subsequent concentration of the extract.

In order to attain this object, the process according to the invention is characterized in that prior to the extraction with water, the cocoa powder is subjected to an extraction with alcohol, particularly with ethanol, and the residue taken as an initial product for the water extraction. The extraction with water primarily removes fat from the cocoa powder. Apart from that, a small part of the theobromine contained in the cocoa powder and small quantities of non-identified cocoa substances are transferred to the alcohol phase.

Depending on the type of alcohol, extraction time and temperature, the extraction of fat and theobromine can be varied within certain limits. Highly advantageous proved to be the use of ethanol for the extraction, the application of elevated temperatures and performing the extraction with alcohol in two successive steps. Treatment with alcohol is preferably performed at a temperature ranging between 60° and 80° C. This way the fat is practically completely removed from the cocoa powder.

The residue which is insoluble in alcohol is freed of residual alcohol. This is preferably done by drying. Then, said residue is extracted with water, preferably at a temperature of approx. 90° C.

Further features concerning the process technique have also proven to be advantageous. For example, the use of two extraction steps has proved highly advantageous for the extraction with water, as the share of extracted cocoa components herewith increases.

Certain features of the invention are of special practical importance. In particular, the residue of the alcohol extraction is first subjected to an enzymatic treatment. Preferably, starch-degrading enzymes such as amyloglucosidase are used. Starch is thus degraded into hydrosoluble degradation products. In the following extraction with water, these products pass into the water extract, so that said extract contains an increased share of hydrosoluble substances compared to a water extract of cocoa powder which has not been treated enzymatically.

After cleaning and concentration, the hydrous extract from cocoa powder made according to the invention is used as hydrosoluble basic substance for making beverages, confectionary etc. Said parent substance is in liquid form or after drying also in powdered form.

The undissolved components are separated from the hydrous extract preferably in a separator. Suitable for concentration is the evaporation of water in a vacuum; drying of the concentrate in order to make a powder can for example be performed by means of freeze drying.

The solid residue resulting from the water extraction mainly consists of cellulose having a water content of 60%. Besides it contains insoluble cocoa components. This cellulose-rich residue is dried and can be used as fibre-rich material for making cocoa and chocolate products rich in dietary fibres.

The advantages of the process according to the invention compared to prior art are that it guarantees the producing of a hydrosoluble cocoa product made of cocoa powder with a high yield, said cocoa product having excellent organoleptic properties and excellent properties relevant for various applications.

FIG. 1 shows a diagrammatic representation of the process according to the invention.

According to FIG. 1, the starting material cocoa powder, preferably highly deoiled cocoa powder with a fat content of 10 to 12% and a particle size of 15 to 30 um is mixed with alcohol, particularly with ethanol. The temperature of the mixture is kept at 60° to 80° C., particularly at 70° C. Agitating this mixture for about 30 min at elevated temperature led to good results. Then, the supernatant alcoholic phase is separated in a decanter. The efficiency of the extraction can be increased if the residue of the alcohol extraction is subjected to a second extraction with alcohol. The residue resulting therefrom is freed of residual alcohol by drying it, if necessary in a vacuum. The alcohol extract or extracts are further processed for recovery of alcohol, theobromine and/or fat. The alcohol can be recovered by means of distillation and then used for further extractions. After the now alcohol-free residue has been dried it can be subjected to an enzymatic treatment, by means of which the efficiency of the subsequent water extraction can be increased. Preferably, the enzymatic treatment is performed with the enzyme amyloglucosidase under enzyme specific conditions (hydrous solution, temperature approx. 70° C.). In order to stop the enzymatic treatment, the mixture is heated to about 90° C. for a short period (about 3 min), thus deactivating the enzyme.

The actual water extraction is either performed with the enzymatically treated residue of the alcohol extraction or directly with the residue freed of alcohol of the alcohol extraction. For this, the dry residue is mixed with water in a ratio of 1:4 and the mixture is heated to 90° C. while being agitated for a period of 30 min to 3 h. As the enzymatically treated residue is already present as a hydrous suspension, the mixture here is only set to a ratio of water and solids (dry residue) of 4:1. The liquid and solid components of the hydrous mixture are separated in a decanter. The liquid obtained is cocoa extract. The solid residue left is cellulose with a 60% water, content in a mixture with further mainly insoluble cocoa substances. In order to improve the process, the residue of the water extraction is again extracted with water. The conditions correspond to those of the first extraction with water. Again, water extract and residue are separated in a decanter. After being dried, the remaining residue is used as fibre material. The water extracts are cleaned from solid components in a separator and subsequently concentrated, if necessary until dryness.

The claimed process is described in more detail below by means of an exemplary embodiment:

EXAMPLE

In a mixing tank, 50 kg cocoa powder (10 to 12% fat, particle size 15 to 30 um) and 200 l ethanol are agitated for 30 min at a temperature of 70° C. This mixture is then conducted through a decanter which separates liquid phase and solid residue (pasty material). The liquid alcoholic phase contains ethanol, fat, theobromine and a very small amounts of further non-identified cocoa components. The pasty residue is cocoa powder which is partly or completely deoiled and has a reduced theobromine content. The residue still contains residual ethanol.

The afore-described ethanol extraction is repeated with the pasty residue. Ethanol and residue are again mixed at 70° C. with a mixing period of 20 to 30 min.

Thereafter, the liquid phase and residue are again separated in a decanter.

The pasty residue is now dried in order to remove residual alcohol. For this reason the residue is preferably treated in a rotary dryer. This way, a flowable product is obtained. Residual alcohol can also be removed during the further course of the process. When producing a cocoa product as defined by the invention in powdered form, residual alcohol can for instance be removed during final freeze drying.

The pasty or dry residue resulting from the alcohol extraction is extracted with water. For this reason said residue (71 kg) is mixed with 275 l of water and heated to 90° C. for 30 min. The ratio of water and residue is 4:1. The hydrous phase and solid residue are separated in a decanter. The liquid obtained this way is cocoa extract. The residue is subjected to another water extraction under the described conditions. The 2nd water extract obtained is mixed with the 1st water extract and conducted into a separator in order to clean out solid components. Thereafter the extract is concentrated in a vacuum apparatus. The concentrate is then converted to powdered form (water content approx. 4%) by means of freeze drying. The yield of soluble cocoa product made according to the invention amounts to 25% by weight with respect to the starting material cocoa powder.

Table I below shows the compositions of the cocoa powder used as starting material, of the cocoa powder extracted with ethanol and of the end product, in particular with respect to fat and theobromine contents.

TABLE I

| Lab No. 03000 | % Fat i. dried subst. | % Fat in subst. | % Theo i. dried subst. | Theo. mg 100 | % solids | pH | Colour value | H$_2$O % | Coff. mg/100 |
|---|---|---|---|---|---|---|---|---|---|
| Cocoa powder (starting material) | 10.70 | | 2.77 | | | 6.91 | 29.7 | 6.34 | |
| Residue after 1st ethanol extraction | 5.02 | | 2.41 | | | | | 44.05 | |
| Residue after 2nd ethanol extraction | 1.47 | | 2.02 | | | | | 45.41 | |
| End sludge | | 0.14 | 1.00 | | 21.02 | 7.64 | | | |
| Ethanol phase 1 | 75.96 | 3.41 | | 198 | 4.49 | | | | 32 |
| Ethanol phase 2 | 62.46 | 0.93 | | 158 | 1.49 | | | | |
| Hydrous extr. aft. decant. | | 0.10 | | 177 | 4.37 | | | | |
| Finish extr. aft. separ. | | 0.10 | | 173 | 3.81 | | | | |
| Cocoa product powder (end product) | 1.62 | | 3.79 | | | 7.09 | 13.2 | 4.44 | |
| water extraction twice | | | 0.26 | | 21.94 | | | | |

The table clearly shows the step-by-step reduction of fat contents and theobromine contents of the cocoa powder when treated with EtOH.

The fact that the cocoa powder is defatted early in the process has positive effects on the subsequent extraction with water. The hydrosoluble components are more easily available for the extraction agent water after defatting, so that there is an accordingly higher extraction yield. The hydrous extract obtained after defatting has an excellent consistency, since practically no fat at all floats on the surface.

The reduction of the theobromine content in the cocoa powder which is also effected during defatting leads to an improved taste of the end product. Because of its characteristic taste and its stimulating effect, theobromine is in principle a desirable substance in cocoa products. In higher concentrations, however, its bitter taste factor predominates and affects the respective product negatively. This is the case with the concentration of a water extract of non-defatted cocoa powder. Theobromine is readily soluble in water and passes into the water extract. When the water extract is concentrated, the theobromine content —in comparison with most of the other cocoa substances —over-proportionally increases, which unpleasantly affects the taste.

As can be seen in Table I, the use of cocoa powder (10,70% fat in dry matter) with a theobromine content of 2.77% in dry matter in the 1st extraction with ethanol led to a reduction in theobromine contents to 2.41% and in the 2nd extraction to 2.02%. The end product contained 3.79% theobromine.

We claim:

1. A process for producing a soluble cocoa product which has reduced fat and theobromine contents comprising:
   a) subjecting roasted cocoa powder to extraction with ethanol in the temperature range of between 60° C. and 80° C. so as to produce an extract containing fat and theobromine and a cocoa powder residue with reduced fat and theobromine contents;
   b) separating the extract and the cocoa powder residue;
   c) subjecting the cocoa powder residue to extraction with ethanol in the temperature range of between 60° C. and 80° C. so as to produce a further extract containing fat and theobromine and a cocoa powder residue with further reduced fat and theobromine contents;
   d) separating the further extract and the cocoa powder residue;
   e) mixing the cocoa powder residue from step d) with water and agitating the mixture in the temperature range of between 60° C. and 95° C. to produce an aqueous extract and cocoa powder residue;
   f) separating the aqueous extract and the cocoa powder residue;
   g) mixing the cocoa powder residue from step f) with water and agitating the mixture in the temperature range of between 60° C. and 95° C. to produce a further aqueous extract and cocoa powder residue; and
   h) concentrating the aqueous extract.

2. The process of claim 1 wherein the ratio of the cocoa powder residue from step d) to water in step e) is 1:4.

3. The process of claim 2 wherein the ratio of the cocoa powder residue from step f) to water in step g) is 1:4.

4. The process of claim 1 wherein the extraction of the cocoa powder with ethanol is conducted at a temperature of approximately 70° C.

5. The process of claim 1 wherein step e) is conducted at approximately 90° C.

6. The process of claim 5 wherein step g) is conducted at approximately 90° C.

7. The process of claim 1 wherein the aqueous extract from step f) and the aqueous extract from step g) are mixed, any undissolved particles are removed from the mixture, and the mixture is concentrated to dryness.

8. The process of claim 1 wherein the roasted cocoa powder is highly deoiled cocoa powder with a fat content of 10 to 12% by weight.

* * * * *